United States Patent [19]

Ueda et al.

[11] Patent Number: 5,285,460
[45] Date of Patent: Feb. 8, 1994

[54] TOTAL-SOLIDIFICATION TYPE TUNABLE PULSE LASER

[75] Inventors: Yoshifumi Ueda, Kochi; Nobuhiro Kodama, Kanagawa, both of Japan

[73] Assignee: Tosoh Corporation, Yamaguchi, Japan

[21] Appl. No.: 889,389

[22] Filed: May 28, 1992

[30] Foreign Application Priority Data

May 30, 1991 [JP] Japan .................................. 3-153692

[51] Int. Cl.$^5$ .............................................. H01S 3/10
[52] U.S. Cl. ........................................ 372/20; 372/41; 372/21; 372/22; 372/10
[58] Field of Search ........................ 372/41, 19, 22, 21, 372/10, 20

[56] References Cited

U.S. PATENT DOCUMENTS

| | | |
|---|---|---|
| 4,701,929 | 10/1987 | Baer et al. . |
| 5,027,361 | 6/1991 | Kozlovsky et al. ............ 372/22 |
| 5,124,999 | 6/1992 | Okazaki et al. ................ 372/22 |
| 5,130,997 | 7/1992 | Ortiz et al. .................... 372/21 |
| 5,173,799 | 12/1992 | Tanuma ......................... 372/22 |
| 5,173,910 | 12/1992 | Pocholle et al. ............... 372/22 |
| 5,177,752 | 1/1993 | Ohya et al. .................... 372/22 |

OTHER PUBLICATIONS

"Generation of Ultrashort Pulses in a Synchronously Pumped Ti3+ Laser" G. B. Al'Tshuler et al. Soviet Technical Physics Letters, vol. 13, No. 7, Jul. 1987, New York pp. 324–325.

"Broadly Tunable high-power operation of an all-solid-state titantium-doped sapphire laser system", T. R. Steele et al., Optics Letters, vol. 16, No. 6, 15 Mar. 1991, New York, US pp. 399–401.

"Ti:sapphire laser pumped by a frequency-doubled diode-pumped Nd:YLF Laser", G. T. Maker et al., Optics Letters, vol. 15, No. 7, 1 Apr. 1990, New York US, pp. 375–377.

"Neodymium-doped yttrium aluminate laser with a pulse repetition frequency of 12.5 Hz and efficient second and third harmonic generation" T. V. Plakhotnik et al., Soviet Journal of Quantum Electronics, vol. 17, No. 8, Aug. 1987, New York, US pp. 1009–1010.

Primary Examiner—Leon Scott, Jr.
Attorney, Agent, or Firm—Sughrue, Mion, Zinn, Macpeak & Seas

[57] ABSTRACT

An all-solid-state tunable pulse laser using a titanium-doped sapphire single crystal in which a pumping source is a pulse beam, which is produced by doubling with a $KTiOPO_4$ under a 90° phase matching condition a Q-switching laser pulse of a light beam, which is produced by a transition of $^4F_{3/2} \rightarrow {}^4I_{11/2}$ in a neodymium-doped yttrium aluminum perovskite crystal pumped with a quasi-continuous diode laser.

12 Claims, 2 Drawing Sheets

TOTAL-SOLIDIFICATION TYPE TUNABLE PULSE LASER

BACKGROUND OF THE INVENTION

This invention relates to a semiconductor-laser-pumped total-solidified tunable pulse laser that uses a titanium-added sapphire monocrystal, which is employed, for instance, in the fields of optical measurement, optical medical treatment, and optical processing which utilize coherent light.

Heretofore, in a tunable solid-state laser using a titanium-doped sapphire ($Ti:Al_2O_3$) single crystal, a pumping light source for laser oscillation has mainly been an argon laser, the second harmonic wave of a flash-lamp-pumped YAG laser, the second harmonic wave of a diode-pumped YLF laser, a copper vapor laser, or a flash lamp. In these cases, the pumping sources are gas lasers or lamps, and therefore the laser devices are inevitably bulky. Furthermore, the service lives of the laser devices depend on those of the lamps used in them, and the maintenance of them is rather troublesome. In addition, the laser devices are not always high in oscillation efficiency.

A method has been proposed in the art in which a pulse laser oscillation is carried out by pumping a titanium-doped sapphire single crystal with the second harmonic wave of a diode-pumped YLF laser, or the second harmonic wave of a diode-pumped YAG laser. However, for example, in the case where the diode-pumped YLF laser is employed, the output is not more than several micro-joules ($\mu j$).

SUMMARY OF THE INVENTION

Accordingly, an object of this invention is to provide an all-solid-state tunable pulse laser using a titanium-doped sapphire single crystal which suffers from none of the deficiencies as described above and is high in oscillation efficiency, considerably small in size, and simple in maintenance.

In order to solve the above-described problems, the present inventors have conducted much research to find the following fact to develop the present invention: of neodymium-doped laser crystals such as Nd:YAG, Nd:YLF, Nd:YVO$_4$ and Nd:LaF$_3$, the Nd:YAP is selected because it has a wavelength of the order of 1.08 $\mu m$ and a long fluorescence lifetime necessary for a Q-switching operation. When the crystal is pumped with a quasi-continuous wave oscillation diode laser providing pulse energy more than several tens of milli-joules (mj) with a wavelength of about 800 nm, a Q-switching pulse is produced. This pulse is doubled by using the characteristic of a KTiOPO$_4$ crystal (hereinafter referred to as "a KTP crystal", when applicable) high in nonlinear sensitivity which, only with wavelengths of around 1.08 $\mu m$, accomplishes a 90° phase matching with an accuracy of $10^{-4}$ or higher, so that a green pulse (540 nm) is produced with high efficiency which has energy of 1 mj or higher necessary for pumping the Ti:Al$_2$O$_3$ tunable laser. The green pulse thus produced is applied to the Ti:Al$_2$O$_3$ single-crystal. On the basis of those findings, a total-solidification type tunable pulse laser small in size and high in oscillation efficiency has been developed.

That is, according to the invention, there is provided an all-solid-state tunable pulse laser using a titanium-doped sapphire single-crystal, in which a pumping source for the sapphire single-crystal is a pulse beam which is produced by doubling a Q-switching laser pulse with a KTiOPO$_4$ under a 90° phase matching condition, the Q-switching laser pulse being is produced through a transition of $^4F_{3/2} \rightarrow {}^4I_{11/2}$ in a neodymium-doped yttrium aluminum perovskite crystal pumped with a quasi-continuous diode laser.

DETAILED DESCRIPTION OF THE PREFERED EMBODIMENTS

Figure 1:
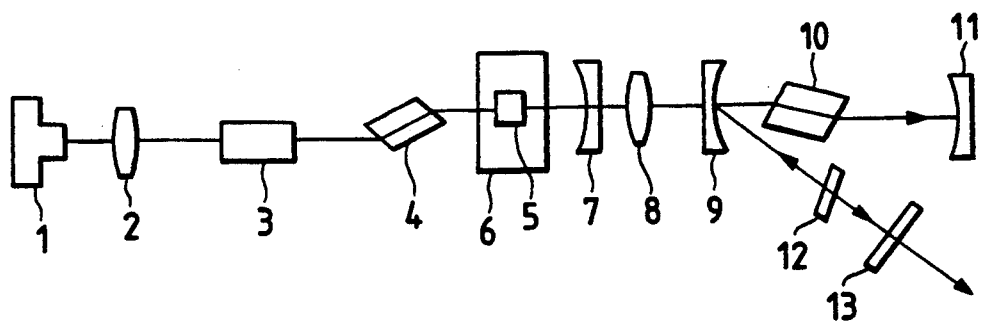
FIG. 1 is an explanatory diagram showing the arrangement of a first embodiment of this invention which employs a Brewster-cut Ti:Al$_2$O$_3$ single crystal.

Preferred embodiments of this invention will now be described in detail.

A tunable pulse laser according to the invention fundamentally comprises a pumping light source section, and a tunable laser oscillation section. The pumping light source section includes a quasi-continuous oscillation diode laser, an ordinary neodymium-doped yttrium aluminum perovskite crystal containing Nd about 1 atm % (Nd:YAlO$_3$, or generally called "Nd:YAP"), a Q-switching element, and a KTP crystal. The tunable laser oscillation section includes a titanium-doped sapphire (Ti:Al$_2$O$_3$) crystal, and a wavelength selecting element (such as a double refraction filter, prism, diffraction grating, or electro-optic crystal).

The Ti:Al$_2$O$_3$ single crystal employed in the invention contains (doped) titanium of 0.01 to 0.3 atm %, and it is generally in the form of a rod (such as a circular cylinder or a prism) having a length of 1 to 30 mm and a diameter or side of 1 to 10 mm.

The Ti:Al$_2$O$_3$ single crystal employed in the invention is preferably obtained according to the following method: However, it should be noted that the invention is not limited thereto or thereby.

The method of manufacturing the titanium-doped sapphire single crystal, corresponding to a so-called "pulling method", uses for instance a pulling apparatus of ratio frequency induction heating system. In the method, its starting raw material is aluminum oxide (Al$_2$O$_3$), and titanium trioxide (Ti$_2$O$_3$) or titanium dioxide (TiO$_2$). The titanium trioxide or titanium dioxide is prepared with the effective segregation coefficient of titanium taken into account so that the resultant crystal contains titanium of 0.01 to 0.3 atm %. If the density of titanium is smaller than 0.01 atm %, then the laser oscillation efficiency is lowered; and if it is larger than 0.5 atm %, concentration extinction occurs, thus decreasing the fluorescence lifetime.

The raw material described above is molten by heating it at its melting temperature, for instance 2000° to 2060° C. As was described above, the crystal is grown from the molten solution of raw material by the pulling method. In this case, the pulling speed is 0.3 to 1 mm/h, and the crystal rotating speed is 80 rpm or lower. As the crystal grows, the depth of the molten solution is decreased. However, it is essential to grow the crystal with the interface between the crystal and the melt being maintained planar. This can be achieved by adjusting the pulling speed and the crystal rotating speed. In this connection, it should be noted that it can be confirmed by observing the striation of the crystal whether or not the solid-liquid interface is substantially planer.

As for an atmosphere for forming the crystal according to the method, it is preferable to maintain the partial pressure of oxygen in the system at $10^{-7}$ to $10^{-13}$ atm, and to employ helium gas as carrier gas. In order to maintain such an atmosphere, it is preferable to employ a reducing atmosphere using a hydrogen gas, a carbon monoxide gas, a mixture gas of hydrogen and carbon dioxide, or a mixture gas of carbon dioxide and carbon monoxide. In this case, the density of the hydrogen gas, the carbon monoxide gas, the mixture gas of hydrogen and carbon dioxide, or the mixture gas of carbon dioxide and carbon monoxide, when used to be mixed with a helium gas, should be about 0.1 to 2 vol % as a standard value. It is believed that, in the case where the helium gas is employed as the carrier gas, the variation in temperature of the melt of raw material is limited within 1° C., and the variation in refractive index of the crystal is decreased. However, in the case where an inert gas such as argon or nitrogen is employed as the carrier gas, the variation in temperature of the melt of raw material is increased, and bubbles are liable to be formed in it. The employment of the helium gas is preferable in that it ensures the security in the case where a flammable gas or a poisonous gas is used for adjusting the partial pressure of oxygen in the system.

In the Ti:Al$_2$O$_3$ single crystal thus formed, the formation of bubbles is suppressed; that is, bubbles are scarcely formed. Thus, the single crystal is small in dislocation density and in refractive index difference; that is, it is an optically uniform high quality titanium-doped sapphire single crystal.

In the pumping light source section of the invention, at least one diode laser of quasi-continuous oscillation type providing energy of several tens of milli-joules (mj) with a wavelength of about 800 nm is employed. The output light of the diode laser is gathered by a light gathering optical system, to pump the Nd:YAP laser, and a Q-switching pulse having a wavelength of around 1.0798 $\mu$m is produced with the aid of the Q-switching element. The wavelength of this pulse is halved by the KTP crystal under a 90° phase matching condition with an accuracy of $10^{-4}$ or higher, so that a pulse light beam of a wavelength of substantially 533.9 nm is produced. In this connection, it is important that, only with wavelengths of around 1.0798 $\mu$m, the KTP crystal achieve the 90° phase matching with an accuracy of $10^{-4}$ or higher. Owing to the 90° phase matching, the allowable angle can be large (10° for instance), and the light beam can be concentrated to some extent with the oscillation efficiency maintained unchanged. In addition, for the same reason, the KTP crystal can be lengthened, and the second harmonic wave can be obtained which is high both in efficiency and in output energy.

In the 90° phase matching by the KTP crystal, sometimes the characteristic of dispersion thereof depends slightly on a KTP crystal forming method (such as a flux method, pulling method, or hydrothermal method) employed. However, this difficulty can be overcome by precisely controlling the crystal temperature as follows: With the accuracy of temperature control taken into account, the crystal temperature is set in a range from room temperature to 100° C., and a temperature controller is used which controls the crystal temperature thus set with a tolerance of the order of ±1° C.

The Q-switching pulse light beam substantially 539.9 nm in wavelength thus obtained is used to pump the Ti:Al$_2$O$_3$ single crystal, so that a tunable laser beam is obtained with the aid of the wavelength selecting element.

In the invention, the pulse light beam provided by the pumping light source section constructed as described above is applied to the Ti:Al$_2$O$_3$ single crystal as a pumping light beam. The end face of the Ti:Al$_2$O$_3$ single crystal is polished to have Brewster's angle, or it is processed so that it will not reflect the laser oscillation light beam, so that the pumping light beam is applied to the end face in such a manner that it is coaxial with the laser oscillation light beam, or the pumping light beam is applied to the side of the crystal in such a manner that it is perpendicular to the laser oscillation light beam.

The invention will be described with reference to the accompanying drawings in more detail. FIGS. 1 through 4 are diagrams showing embodiments of the invention in which the same reference numerals designate the same or like parts. However, it should be noted that the invention is not limited thereto or thereby.

In the embodiment shown in FIG. 1, one diode laser is employed as a pumping light source. A light beam (having a wavelength of about 800 nm) emitted from a pumping light source 1 is passed through a condenser lens 2, to pump an Nd:YAP crystal 3 to cause the latter to produce a light beam of a wavelength of 1.0798 $\mu$m. Thereafter, with the aid of a Q-switching element (or electro-optical element) 4, a giant pulse light beam is produced. This pulse light beam is converted into the second harmonic (539.9 nm) wave by a KTP crystal 5 under a 90° phase matching condition. Next, the pulse light beam passed through a mirror and a lens is applied to a Ti:Al$_2$O$_3$ single crystal 10 through its Brewster-cut surface to pump the latter. In the drawing, reference numeral 6 designates a temperature controller; 7, a reflecting mirror; 8, a condenser lens; 9, a reflecting mirror; 11, a reflecting mirror; 12, a wavelength selecting element; and 13, a reflecting mirror.

Figure 2:
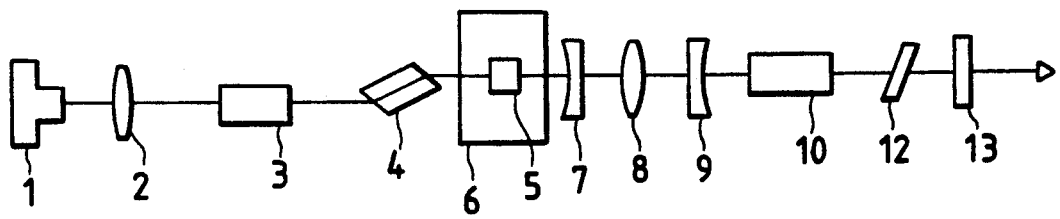
FIG. 2 is an explanatory diagram showing the arrangement of a second embodiment of this invention which employs a Ti:Al$_2$O$_3$ single crystal whose end face is made non-reflectable.

In the embodiment shown in FIG. 2, a Ti:Al$_2$O$_3$ single crystal 10 having a non-reflection end face is employed.

Figure 3:
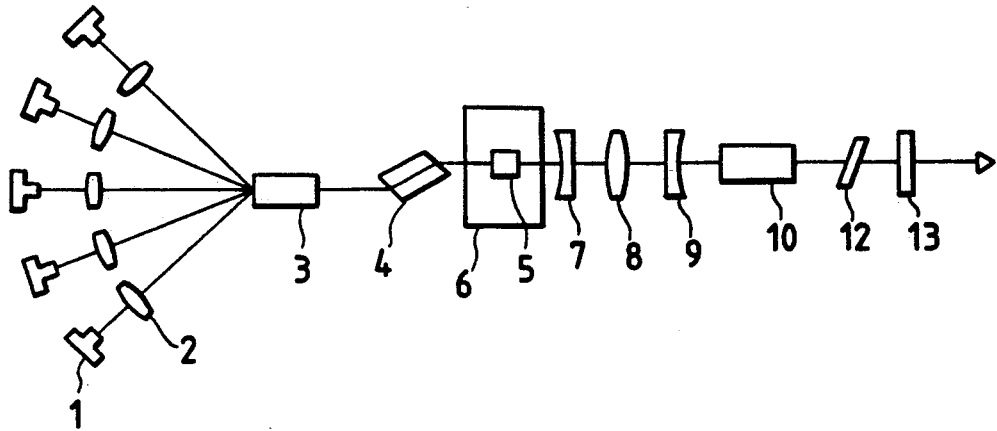
FIG. 3 is an explanatory diagram showing the arrangement of a third embodiment of this invention in which a plurality of diode lasers and a plurality of condenser lenses are employed.

In the embodiment shown in FIG. 3, a plurality of diode lasers 1 and a plurality of condenser lens 2 are employed.

Figure 4:
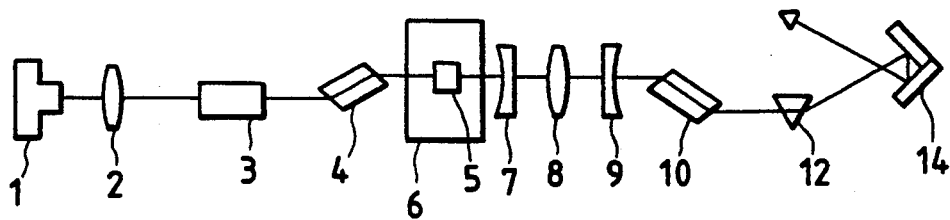
FIG. 4 is an explanatory diagram showing the arrangement of a fourth embodiment of the invention which employs a prism as a wavelength selecting element, and a wavelength selecting two-mirror unit made up of two mirrors combined together.

In the embodiment shown in FIG. 4, a prism is employed as a wavelength selecting element 12 and a wavelength selecting two-mirror unit 14 comprising two mirrors in combination is employed. A specific feature of the embodiment resides in that, when the prism is turned for selection of a wavelength, the laser beam is prevented from being changed in the direction of emergence thereof; that is, the wavelength selecting two-mirror unit is turned in association with the rotation of the prism, so that the laser beam is outputted in a predetermined direction at all times.

A concrete example of the above-described method of manufacturing the Ti:Al$_2$O$_3$ single crystal suitable for the present invention will be described.

Aluminum oxide 5N in purity, and titanium trioxide 4N in purity were prepared to a mole ratio of 0.99:0.01, and mixed together. The mixture was sintered at about 1600° C. The mixture thus sintered was put in an iridium crucible 47 mm in inside diameter and 48.5 mm in depth, and then molten by heating it at 2050° C. As for an atmosphere for forming the Ti:Al$_2$O$_3$ single crystal, a mixture gas obtained by preparing a hydrogen gas and a carbon dioxide gas to a volume ratio of 500:1 was mixed with a helium gas of a carrier gas, and the partial pressure of oxygen was set to about $10^{-8}$ atm.

Figure 5:
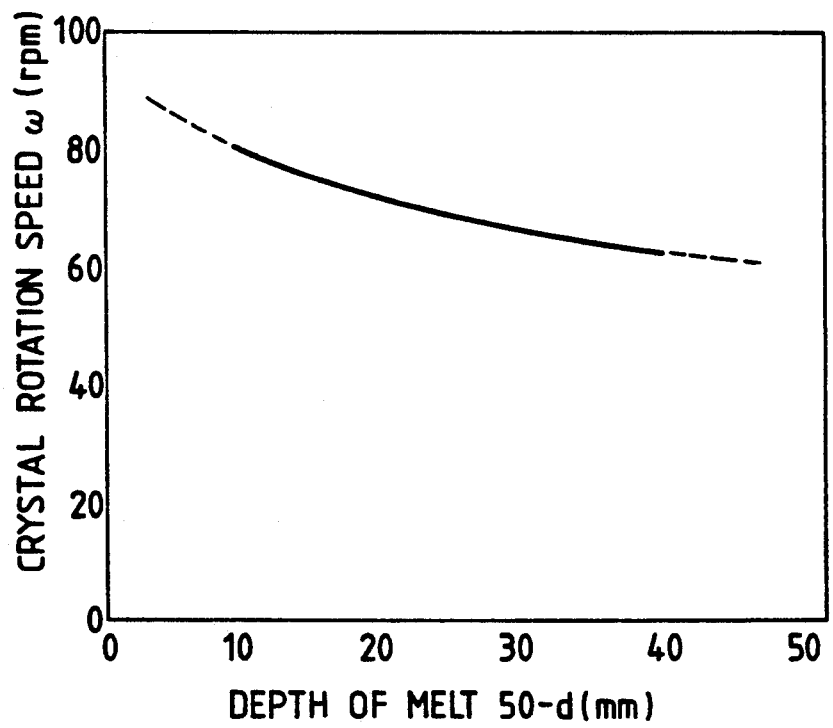
FIG. 5 is a diagram indicating variations in the speed of rotation of a crystal with respect to variations in depth of a melt in manufacture of the Ti:Al$_2$O$_3$ single crystal according to a pulling method.

The pulling speed was 0.4 mm/h. The pulling method was practiced while the speed of crystal rotation was decreased from 80 rpm with the decrease in depth of the melt according to a characteristic curve shown in FIG. 5. FIG. 5 indicates variations in the speed of rotation of the crystal with respect to variations in depth of the melt. The data therein is obtained through calculation under the condition that natural convention and forcible convention are balanced with each other, so as to maintain the solid-liquid interface planar after the crylstal becomes constant in diameter. In the titanium-doped sapphire single crystal thus formed, no bubbles acting as light scattering sources were included after the crystal became constant in diameter; that is, no such bubbles were present in its straight portion.

As a result of the measurement of an X-ray topograph, in both the (0001) surface and the (1120) surface, the dislocation density was found less than $10^3$/cm$^2$. The refractive index difference in the crystal measured with a Twyman-Green interferometer was $\Delta n = 3 \times 10^{-5}$.

In the tunable pulse laser of the invention, being constructed as described above, the second harmonic wave high both in efficiency and output energy can be provided, and a tunable laser beam high in efficiency and in output energy can be produced by the titanium-doped sapphire single crystal. The tunable pulse laser of the invention is small in size, and is therefore simple in maintenance.

What is claimed is:

1. A tunable pulse laser, comprising:
   an all-solid-state tunable laser oscillation section including a total-solidified titanium-doped sapphire single crystal; and
   a pumping light source section including quasi-continuous semiconductor lasers, said semiconductor lasers pumping a neodymium-doped yttrium aluminum perovskite (Nd:YAP) crystal, said Nd:YAP crystal emitting a light beam produced by a transition of $^4F_{3/2} \rightarrow ^4I_{11/2}$, said light beam passing through a Q-switching element, said Q-switching element converting said light beam into a Q-switching laser pulse, said Q-switching laser pulse passing through a KTiOPO$_4$ crystal, said KTiOPO$_4$ crystal performing 90° phase matching and doubling to thereby produce a pulse beam.

2. A tunable pulse laser as claimed in claim 1, wherein said titanium-doped sapphire single crystal is rod-shaped.

3. A tunable pulse laser as claimed in claim 2, wherein an end face of said titanium-doped sapphire single crystal is polished to have Brewster's angle and said pulse beam is applied to said titanium-doped sapphire single crystal in such a manner as to be coaxial with a laser oscillation light beam.

4. A tunable pulse laser as claimed in claim 2, wherein an end of said titanium-doped sapphire single crystal is so made as not to reflect a laser oscillation light beam and said pulse beam is applied to said titanium-doped sapphire single crystal in such a manner as to be coaxial with said laser oscillation light beam.

5. A tunable pulse laser as claimed in claim 2, wherein an end face of said titanium-doped sapphire single crystal is polished to have Brewster's angle and said pulse beam is applied to a side of said titanium-doped sapphire single crystal in such a manner as to be perpendicular to a laser oscillation light beam.

6. A tunable pulse laser as claimed in claim 2, wherein an end of said titanium-doped sapphire single crystal is so made as not to reflect a laser oscillation light beam and said pulse beam is applied to a side of said titanium-doped sapphire single crystal in such a manner as to be perpendicular to said laser oscillation light beam.

7. A tunable pulse laser as claimed in claim 1, wherein said titanium-doped sapphire single crystal is plated-shaped.

8. A tunable pulse laser as claimed in claim 7, wherein an end face of said titanium-doped sapphire single crystal is polished to have Brewster's angle and said pulse beam is applied to said titanium-doped sapphire single crystal in such a manner as to be coaxial with a laser oscillation light beam.

9. A tunable pulse laser as claimed in claim 7, wherein an end of said titanium-doped sapphire single crystal is so made as not to reflect a laser oscillation light beam and said pulse beam is applied to said titanium-doped sapphire single crystal in such a manner as to be coaxial with said laser oscillation light beam.

10. A tunable pulse laser as claimed in claim 7, wherein an end face of said titanium-doped sapphire single crystal is polished to have Brewster's angle and said pulse beam is applied to a side of said titanium-doped sapphire single crystal in such a manner as to be perpendicular to a laser oscillation light beam.

11. A tunable pulse laser as claimed in claim 7, wherein an end of said titanium-doped sapphire single crystal is so made as not to reflect a laser oscillation light beam and said pulse beam is applied to a side of said titanium-doped sapphire single crystal in such a manner as to be perpendicular to said laser oscillation light beam.

12. A tunable pulse laser as claimed in claim 1, wherein said laser oscillation section further includes a wavelength selecting element.

* * * * *